(12) United States Patent
Li et al.

(10) Patent No.: US 11,909,467 B2
(45) Date of Patent: Feb. 20, 2024

(54) METHOD AND APPARATUS FOR CONTROLLING PRECODING, AND TERMINAL DEVICE AND BASE STATION

(71) Applicant: ZTE CORPORATION, Shenzhen (CN)

(72) Inventors: Yong Li, Shenzhen (CN); Hao Wu, Shenzhen (CN); Guozeng Zheng, Shenzhen (CN); Zhaohua Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 88 days.

(21) Appl. No.: 17/593,950

(22) PCT Filed: Mar. 24, 2020

(86) PCT No.: PCT/CN2020/080768
§ 371 (c)(1),
(2) Date: Sep. 28, 2021

(87) PCT Pub. No.: WO2020/199966
PCT Pub. Date: Oct. 8, 2020

(65) Prior Publication Data
US 2022/0158698 A1 May 19, 2022

(30) Foreign Application Priority Data
Mar. 29, 2019 (CN) .......................... 201910251632.8

(51) Int. Cl.
H04B 7/02 (2018.01)
H04B 7/0417 (2017.01)
H04B 7/0456 (2017.01)

(52) U.S. Cl.
CPC ......... *H04B 7/0417* (2013.01); *H04B 7/0486* (2013.01)

(58) Field of Classification Search
CPC .......................... H04B 7/0417; H04B 7/0486
(Continued)

(56) References Cited

U.S. PATENT DOCUMENTS

| 2015/0215934 A1 | 7/2015 | Davydov et al. |
| 2018/0262244 A1 | 9/2018 | Noh et al. |

(Continued)

FOREIGN PATENT DOCUMENTS

| CN | 102223212 | 10/2011 |
| CN | 102792605 | 11/2012 |

(Continued)

OTHER PUBLICATIONS

Chinese First Office Action dated Jul. 19, 2022 from related CN 201910251632.8 (15 pgs).

(Continued)

*Primary Examiner* — Zewdu A Kassa
(74) *Attorney, Agent, or Firm* — Knobbe, Martens, Olson & Bear, LLP

(57) ABSTRACT

Provided are a method, an apparatus, a terminal device and a base station for controlling precoding. The method includes: receiving configuration parameters configured by a base station for the precoding, where the precoding is used for feeding back a channel state; determining an upper limit value of a feedback number of coefficients of composition vectors of the precoding according to the configuration parameters; and adjusting the upper limit value of the feedback number.

19 Claims, 6 Drawing Sheets

(58) Field of Classification Search
USPC ........ 375/267, 261, 260, 259, 219, 295, 316
See application file for complete search history.

(56) References Cited

U.S. PATENT DOCUMENTS

| | | | |
|---|---|---|---|
| 2019/0181929 A1 | 6/2019 | Ge et al. | |
| 2019/0326974 A1* | 10/2019 | Li | H04B 7/0695 |
| 2022/0109480 A1* | 4/2022 | Hao | H04L 5/0057 |

FOREIGN PATENT DOCUMENTS

| | | |
|---|---|---|
| CN | 105099604 | 11/2015 |
| CN | 105850225 A | 8/2016 |
| CN | 108111195 A | 6/2018 |
| CN | 108886426 | 11/2018 |
| CN | 109075904 | 12/2018 |
| CN | 110535505 A | 12/2019 |
| WO | WO 2018203307 A1 | 11/2018 |

OTHER PUBLICATIONS

Chinese First Search Report from related CN 201910251632.8 (5 pgs).

International Search Report for PCT/CN2020/080768 dated Jun. 10, 2020.

Samsung: "CSI enhancement for MU-MIMO", Feb. 25-Mar. 1, 2019, 3GPP TSG RAN WG1 meeting #96, R1-1903359.

ZTE: "CSI Enhancement for MU-MIMO Support", Feb. 25-Mar. 1, 2019, 3GPP TSG RAN WG1 meeting #96, R1-1903343.

Qualcomm Incorporated: "CSI Enhancement for MU-MIMO Support", 3GPP Draft; R1-1903042 CSI Enhancement for MU-MIMO Support, $3^{rd}$ Generation Partnership Project (3GPP), Mobile Competence Centre; 650, Route Des Lucioles; F-06921 Sophia-Antipolis Cedex; France, vol. RAN WG1, No. Athens, Greece; Feb. 25, 2019-Mar. 1, 2019, Feb. 16, 2019.

The Extended European Search Report for European Patent Application No. 20782465.7 dated Nov. 16, 2022 by European Patent Office.

* cited by examiner

METHOD AND APPARATUS FOR CONTROLLING PRECODING, AND TERMINAL DEVICE AND BASE STATION

This is a U.S. National Stage Application, filed under 35 U.S.C. 371, of International Patent Application No. PCT/CN2020/080768, filed on Mar. 24, 2020, which claims priority to Chinese Patent Application No. 201910251632.8 filed with the CNIPA on Mar. 29, 2019, the contents of which are incorporated herein by reference in their entireties.

TECHNICAL FIELD

The present disclosure relates to the field of wireless communication network, for example, to a method for controlling precoding and an apparatus therefor, a terminal device and a base station.

BACKGROUND

The precoding technique for multi-antenna wireless communication technology is to perform precoding on transmit antennas to improve communication performance. Generally, a transmitting side transmits one reference signal (RS) on one resource, and a receiving side measures channel state information (CSI) by using the reference signal and then feeds back the measured channel state information in the form of precoding. The precoding is generally fed back in the manner of precoding matrix indicator (PMI) information. In order that the channel state is fed back in the form of precoding with high accuracy, the precoding is composed of a linear combination of multiple vectors, and precoding information is fed back in the manner of vectors composing the precoding and coefficients of respective vectors.

In the process of precoding, the transmitting side directly transmits control parameters of a control feedback report to the receiving side, and then the receiving side performs precoding by using the received control parameters. However, such approach of directly transmitting control parameters may result in some unreasonable control parameter combinations and accordingly, the resource overhead of precoding feedback is increased, and it is difficult to ensure precoding report accuracy.

SUMMARY

Embodiments of the present disclosure provide a method for controlling precoding. The method includes: receiving configuration parameters configured by a base station for the precoding, where the precoding is used for feeding back a channel state; determining an upper limit value of a feedback number of coefficients of composition vectors of the precoding according to the configuration parameters; and adjusting the upper limit value of the feedback number.

The embodiments of the present disclosure provide a method for controlling precoding. The method includes: sending configuration parameters configured for the precoding to a terminal device, where the precoding is used for feeding back a channel state; determining an upper limit value of a feedback number of coefficients of composition vectors of the precoding according to the configuration parameters; and adjusting the upper limit value of the feedback number.

The embodiments of the present disclosure provide an apparatus for controlling precoding. The apparatus includes a reception module, a determination module and an adjustment module.

The reception module is configured to receive configuration parameters configured by a base station for the precoding, where the precoding is used for feeding back a channel state.

The determination module is configured to determine, according to the configuration parameters, an upper limit value of a feedback number of coefficients of composition vectors of the precoding.

The adjustment module is configured to adjust the upper limit value of the feedback number.

The embodiments of the present disclosure provide an apparatus for controlling precoding. The apparatus includes a sending module, a determination module and an adjustment module.

The sending module is configured to send configuration parameters configured for the precoding to a terminal device, where the precoding is used for feeding back a channel state.

The determination module is configured to determine, according to the configuration parameters, an upper limit value of a feedback number of coefficients of composition vectors of the precoding.

The adjustment module is configured to modify the upper limit value of the feedback number.

The embodiments of the present disclosure provide a terminal device for controlling precoding. The terminal device includes a processor and a memory. The memory is configured to store instructions. The processor is configured to read the instructions to execute any one of the methods provided by the embodiments of the present disclosure.

The embodiments of the present disclosure provide a base station for controlling precoding. The base station includes a processor and a memory. The memory is configured to store instructions. The processor is configured to read the instructions to execute any one of the methods provided by the embodiments of the present disclosure.

The embodiments of the present application provide a storage medium. The storage medium is configured to store computer programs which, when executed by a processor, implement any one of the methods of the embodiments of the present disclosure.

According to the embodiments of the present disclosure, the upper limit value of the feedback number of coefficients in a system matrix composing the precoding is adjusted, so that the resource overhead in the subsequent process of precoding reporting is reduced, and the accuracy of the report of the precoding is ensured.

DETAILED DESCRIPTION

Figure 1:
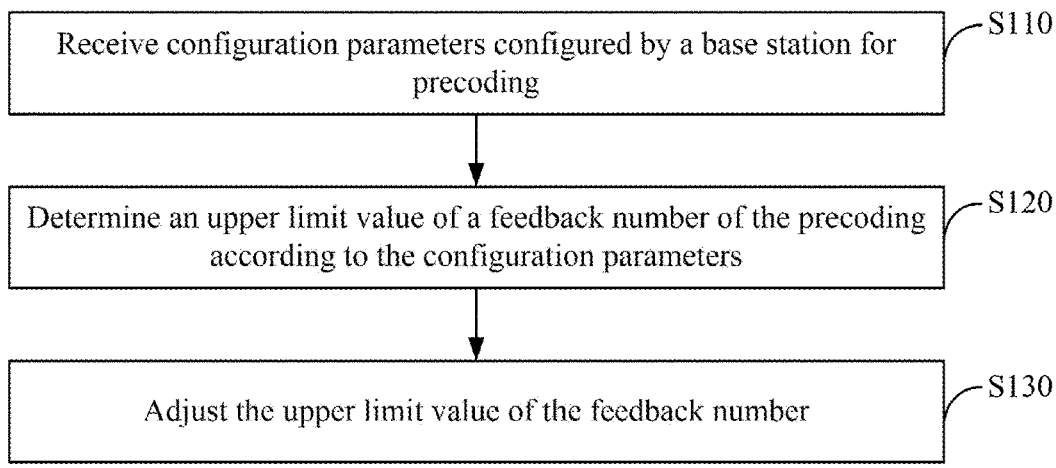
FIG. 1 is a flowchart of a method for controlling precoding according to an embodiment of the present disclosure.

Embodiments of the present disclosure are described hereinafter in detail in conjunction with the drawings. It is to be noted that if not in collision, embodiments and features therein in the present disclosure may be combined with each other in any manner.

In the embodiments of the present disclosure, precoding is composed of a linear combination of multiple vectors, and precoding information is fed back in the manner of vectors composing the precoding and coefficients of respective vectors. One layer of precoding may be composed in the manner that W=VCU. W represents precoding of a certain transmission layer and is a matrix of $N_{Tx}$ rows and $N_3$ columns. $N_{Tx}$ represents the number of antenna ports, and $N_3$ represents the number of frequency domain units of a precoding matrix indicator (PMI). The rows of W correspond to antenna ports of a transmitting side. Matrix V, matrix C and matrix U are defined as follows.

$$V = \begin{bmatrix} v_0, v_1, \ldots, v_{L-1} & 0 \\ 0 & v_0, v_1, \ldots, v_{L-1} \end{bmatrix}.$$

V is a matrix composed of zero elements and L column vectors $v_l$, where l=0, 1, . . . , L−1.

L is a positive integer, and vector $v_l$ is referred to as a space domain vector.

$$U = [u_0^T, u_1^T, \ldots u_{M-1}^T]^T.$$

U is a matrix composed of M row vectors $u_m$, where m=0, 1, . . . , M−1. M is a positive integer, and vector $u_m$ is referred to as a frequency domain vector.

$$C = \begin{bmatrix} c_{0,0} & c_{0,1} & \ldots & c_{0,M-1} \\ c_{1,0} & c_{1,1} & \ldots & c_{1,M-1} \\ \vdots & \vdots & \ldots & \vdots \\ c_{2L-1,0} & c_{2L-1,1} & \ldots & c_{2L-1,M-1} \end{bmatrix}.$$

C is a matrix of 2 L rows and M columns, and elements in the matrix are coefficients of column vectors in the matrix V and coefficients of row vectors in the matrix U.

A terminal device feeds back L vectors $v_l$ composing the matrix V and M vectors $u_m$ composing the matrix U to a base station, and indicates coefficients and positions corresponding to fed-back vectors in the matrix C in the manner of bitmap. The value of the coefficients that are not indicated by the bitmap but are fed back in the matrix C is 0 by default.

The space domain vector $v_l$ may be selected from a predefined codebook, and the frequency domain vector $u_m$ may also be selected from a predefined codebook. The number of elements in the frequency domain vector $u_m$ may be referred to as the number $N_3$ of frequency domain units of the PMI, and is equal to the number of base vectors in the space of the predefined codebook where the frequency domain vector $u_m$ is located. Therefore, the number $N_3$ of frequency domain units also represents the number of base vectors in the space of the predefined codebook where the frequency domain vector $u_m$ is located.

The base station uses a frequency domain subband as a unit, and indicates in the manner of the bitmap to the terminal a frequency domain range that needs to feed back the channel state. The number of frequency domain subbands that need to feed back the channel state may be marked as $N_{SB}$.

The ratio of the size of the frequency domain unit that feeds back a channel quality indicator (CQI) to the size of the frequency domain unit that feeds back the PMI may be marked as R. For example, the ratio of the size of the frequency domain subband that feeds back the CQI to the size of the frequency domain subband that feeds back the PMI may be marked as R. The number $N_3$ of frequency domain units of the PMI is determined by $N_{SB}$ and R.

To control the resource overhead of the terminal feeding back the PMI and the accuracy of the feedback, the base station transmits control parameters (L, M, $K_0$) of a control feedback report to the terminal. The terminal feeds back L space domain vectors $v_l$ composing the matrix V to the base station, the terminal feeds back M frequency domain vectors $u_m$ composing the matrix U to the base station, and the terminal feeds back at most $K_0$ coefficients in the matrix C to the base station.

If the precoding fed back by the terminal is used for 1-layer transmission of in space domain, the rank of precoding is referred to as 1; if the precoding fed back by the terminal is used for the 2-layer transmission in space domain, the rank of the precoding is referred to as 2; similarly, if the precoding fed back by the terminal is used for RI-layer transmission, the rank of the precoding is referred to as RI, for example, RI=1, 2, 3 and 4. The terminal feeds back the rank of the precoding and the precoding. The base station transmits to the terminal control parameters (L, M, $K_0$) of a report corresponding to each possible rank and corresponding to the PMI of each layer of the rank.

The relationship between the rank and the layer of the precoding is: if the feedback precoding has 1 layer in total, the rank is 1; if the feedback precoding has 2 layers in total, the rank is 2; if the feedback precoding has n layers in total, the rank is n.

The base station can directly configure the control parameter L. In order to enable the number M of frequency domain vectors $u_m^T$ composing the matrix U to adapt to the number $N_3$ of frequency domain units of the PMI, the base station configures a parameter p, and can determine the control parameter M through the following relationship:

$$M = \left\lceil p \times \frac{N_3}{R} \right\rceil.$$

The base station configures a parameter β, and determines the parameter $K_0$ through the following relationship: $K_0 = \lceil \beta \times 2LM \rceil$.

However, this transmission method of control parameters will result in some unreasonable control parameter combinations. Accordingly, the resource overhead of the report is wasted, and it is hard to ensure the accuracy of the report of the precoding.

Referring to FIG. 1, a method for controlling precoding is provided according to an embodiment of the present disclosure. The method includes steps S110 to S130.

In step S110, configuration parameters configured by a base station for the precoding are received. The precoding is used for feeding back a channel state. The configuration parameters include the following of the precoding: a number of space domain vectors, an influence parameter of a number of frequency domain vectors, an influence parameter of an upper limit value of a feedback number of coefficients in a coefficient matrix, and frequency domain information of the number of frequency domain vectors.

In step S120, an upper limit value of a feedback number of coefficients of composition vectors of the precoding is determined according to the configuration parameters. The coefficients of the composition vectors of the precoding may be represented by a coefficient matrix.

In step S130, the upper limit value of the feedback number is adjusted.

In the embodiment, a terminal device may feed back the channel state to the base station in the form of precoding. Therefore, the base station configures following configuration parameters for the precoding: the number L of space domain vectors of the precoding, the influence parameter p of the number of frequency domain vectors of the precoding, the influence parameter $\beta$ of the upper limit value of the feedback number of the coefficients in the coefficient matrix of the precoding, and the frequency domain information of the number of frequency domain vectors of the precoding. The frequency domain information includes related information that affects the number of frequency domain vectors.

In some embodiments, the number of frequency domain vectors is determined according to the influence parameter of the number of frequency domain vectors and the frequency domain information. The number of frequency domain vectors is represented as M. The base station sets the influence parameter p of the number of frequency domain vectors, so as to adjust the number M of frequency domain vectors to adapt to the frequency domain information. Therefore, the terminal receives the influence parameter p of the number of frequency domain vectors and the frequency domain information configured by the base station, so as to determine the number of frequency domain vectors feeding back the PMI report, that is, the number of frequency domain vectors composing the matrix U of the precoding.

In some embodiments, after the number of space domain vectors and the number of frequency domain vectors are determined, the upper limit value of the feedback number can be determined based on the number of space domain vectors, the number of frequency domain vectors and the influence parameter of the upper limit value of the feedback number.

In the embodiment, the coefficients of the composition vectors of the precoding are the elements in the coefficient matrix C of the precoding. The coefficient matrix C of the precoding is a matrix of 2 L rows and M columns, and the elements in the matrix are the coefficients of the column vectors in the matrix V and the coefficients of the row vectors in the matrix U, so that the coefficient matrix C at least feeds back 2LM coefficients. Therefore, the base station configures the influence parameter $\beta$ of the upper limit value of the feedback number of the coefficients in the coefficient matric C, and thus the upper limit value $K_0$ of the feedback number of the coefficients in the coefficient matrix C can be determined through the following relationship: $K_0 = \lceil \beta \times 2LM \rceil$.

In the embodiment, after the configuration parameters and the upper limit value of the feedback number of the precoding are determined preliminarily, the terminal can modify the upper limit value $K_0$ of the feedback number of the coefficients in the coefficient matrix C according to the rank of the transmission layer of the precoding or a value range of the number of frequency domain vectors, so as to reduce unreasonable control parameter combinations, save the resource overhead of the reporting process, and ensure the accuracy of the report of the precoding. The control parameters include the number L of space domain vectors, the number M of frequency domain vectors and the upper limit value $K_0$ of the feedback number.

In some embodiments, the frequency domain information may include a frequency domain subband that needs to feed back the channel state, and the ratio of the size of a frequency domain subband that feeds back the channel quality indicator to the size of a frequency domain subband that feeds back the precoding. The number of the frequency domain subband that needs to feed back the channel state may be represented as $N_{SB}$. The ratio of the size of the frequency domain subband that feeds back the channel quality indicator to the size of the frequency domain subband that feeds back the precoding may be represented as R.

In the embodiment, the channel state is always fed back for a certain frequency domain range, and the base station indicates, in the manner of the bitmap, frequency domain subbands for which the channel state is fed back. These frequency domain subbands are a feedback unit of the channel quality indicator, that is, the CQI is fed back in units of these frequency domain subbands. On the other hand, within the certain frequency domain range, the precoding is fed back in units of another kind of frequency domain subbands, and this kind of frequency domain subbands are referred to as PMI frequency domain subbands. In one PMI report, the number $N_3$ of frequency domain units of the PMI needs to be determined by the number $N_{SB}$ of frequency domain subbands that need to feed back the channel state and the ratio R of the size of the frequency domain subband that feeds back the CQI to the size of the frequency domain subband that feeds back the PMI.

Therefore, in some embodiments, the process of determining the number of frequency domain vectors of the precoding may include steps described below.

First, the number $N_3$ of frequency domain units is determined based on the frequency domain subbands and the ratio R of the size of the frequency domain subband that feeds back the CQI to the size of the frequency domain subband that feeds back the PMI. The base station can indicate the range of the frequency domain subbands to the terminal device, the terminal counts the number of frequency domain subbands, and the number can be represented as $N_{SB}$. Alternatively, the base station, while indicating the range of the frequency domain subbands to the terminal device, also sends the number $N_{SB}$ of frequency domain subbands to the terminal device.

Then, the number of frequency domain vectors is determined based on the number $N_3$ of frequency domain units, the ratio of the size of the frequency domain subband that feeds back the CQI to the size of the frequency domain subband that feeds back the PMI, and the influence parameter p of the number of frequency domain vectors.

In the embodiment, the number M of frequency domain vectors may be determined according to the following formula:

$$M = \left\lceil p \times \frac{N_3}{R} \right\rceil.$$

The operator ⌈ ⌉ represents a round-up function.

In some embodiments, the above number $N_3$ of frequency domain units may include one of the products described below.

First, the product of the number $N_{SB}$ of frequency domain subbands and the ratio R of the size of the frequency domain subband that feeds back the CQI to the size of the frequency domain subband that feeds back the PMI is expressed as the first product, that is, $N_3 = N_{SB} \times R$.

Second, the product of at least two numbers selected from multiple preset positive integers is expressed as the second product. For example, the product of at least two numbers selected from three positive integers 2, 3 and 5 is configured as the number $N_3$ of frequency domain units.

In some embodiments, one product may be selected from the above candidate second products as the number $N_3$ of frequency domain units. The selection rule may be: the product not less than the first product and closest to the first product is selected.

To avoid the occurrence of unreasonable control parameter combination values, the modification to the upper limit value $K_0$ of the feedback number of the coefficients in the coefficient matrix C of the precoding in the above steps may include at least one of the following.

First, the upper limit value $K_0$ of the feedback number is modified. For example, the upper limit value $K_0$ of the feedback number is processed by adopting a function, and the result of the function is configured as the modified upper limit value $K_0$ of the feedback number.

Second, at least one configuration parameter among (L, p, β) or at least one control parameter from (L, M) that affects the upper limit value $K_0$ of the feedback number is modified, and the upper limit value $K_0$ of the feedback number is modified by using the modified parameter. For example, a parameter value related to the upper limit value $K_0$ of the feedback number is modified, or a value range of the parameter value is limited.

In some embodiments, the modification to the upper limit value $K_0$ of the feedback number may be not adjusted with the variation of the rank. For example, the case described below may be included.

One with a relatively large value is selected from the upper limit value $K_0$ of the feedback number and a preset upper limit value A of the feedback number as the upper limit value of the feedback number. A is a positive integer. The upper limit value $K_0$ of the feedback number may be determined by a function of parameters (L, M) or a function of parameters (L, p, β) as follows:

$$F() = \left\lceil \beta \times 2L \left\lceil p \times \frac{N_3}{R} \right\rceil \right\rceil = \lceil \beta \times 2LM \rceil.$$

Figure 2:
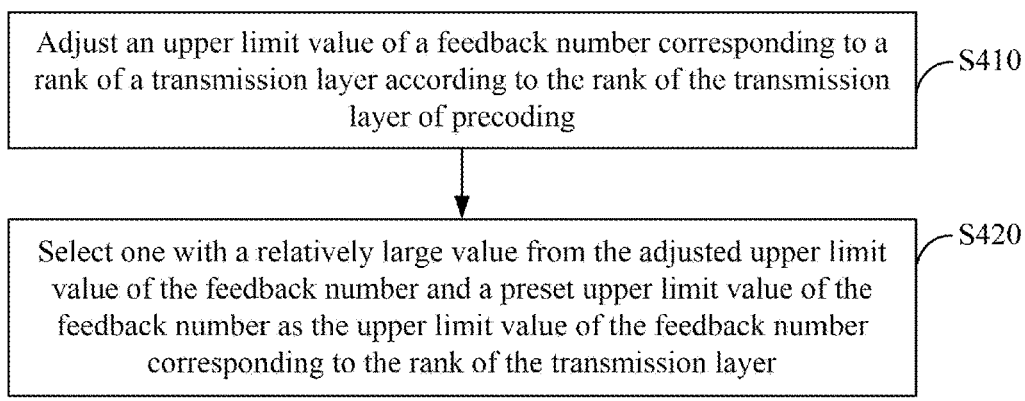
FIG. 2 is a flowchart of a process of modifying an upper limit value of a feedback number according to an embodiment of the present disclosure.

In some embodiments, the modification to the upper limit value of the feedback number may be determined according to a rank of a transmission layer of the precoding. Referring to FIG. 2, the modification process of the upper limit value of the feedback number in the embodiment of the present disclosure may include steps S410 to S420.

In step S410, an upper limit value of the feedback number corresponding to a rank RI of a transmission layer is adjusted according to the rank RI of the transmission layer of the precoding. The upper limit value of the feedback number corresponding to the rank of the transmission layer may be represented as $K_{0,RI}$.

In step S420, one with a relatively large value is selected from the adjusted upper limit value of the feedback number and the preset upper limit value A of the feedback number as the upper limit value $K_{0,RI}$ of the feedback number corresponding to the rank of the transmission layer.

In the embodiment, the function of parameters (L, M) or the function of parameters (L, p, β) is adjusted in combination of the rank RI of the transmission layer, the adjusted function may include any one of the following functions, and step S410 may be executed by using the adjusted function to determine the adjusted upper limit value of the feedback number:

$$F() = \left\lceil \beta \times 2L \left\lceil \frac{2 \times p}{RI} \times \frac{N_3}{R} \right\rceil \right\rceil;$$

$$F() = \left\lceil \beta \times 2 \times \frac{2 \times L}{RI} \left\lceil p \times \frac{N_3}{R} \right\rceil \right\rceil;$$

$$F() = \left\lceil \frac{2 \times \beta}{RI} \times 2L \left\lceil p \times \frac{N_3}{R} \right\rceil \right\rceil;$$

$$F() = \left\lceil \beta \times 2L \left\lceil a_{RI} \times p \times \frac{N_3}{R} \right\rceil \right\rceil;$$

$$F() = \left\lceil \beta \times 2 \times a_{RI} \times L \left\lceil p \times \frac{N_3}{R} \right\rceil \right\rceil;$$

$$F() = \left\lceil a_{RI} \times \beta \times 2L \left\lceil p \times \frac{N_3}{R} \right\rceil \right\rceil.$$

The first three functions are different variants of the same function. The last three functions are also different variants of the same function.

$a_{RI}$ may be a preset positive number, or $a_{RI}$ may be a function related to the rank RI, and the result of the function is a positive number. In some embodiments, the terminal device predefines $a_{RI}$ based on a protocol of the precoding and according to the value of the rank RI.

Alternatively, in some embodiments, the base station independently configures $a_{RI}$ according to the value of the rank RI.

In some embodiments, different functions are selected according to a value range of the rank.

For example, if the rank is a first class of rank, the function satisfying that $$F() = \left\lceil \beta \times 2L \left\lceil p \times \frac{N_3}{R} \right\rceil \right\rceil$$

is selected. If the rank is a second class of rank, one of the following functions is selected:

$$F() = \left\lceil \beta \times 2L \left\lceil a_{RI} \times p \times \frac{N_3}{R} \right\rceil \right\rceil,$$

$$F() = \left\lceil \beta \times 2 \times a_{RI} \times L \left\lceil p \times \frac{N_3}{R} \right\rceil \right\rceil$$

or $$F()=\left\lceil a_{RI}\times\beta\times2L\left\lceil p\times\frac{N_3}{R}\right\rceil\right\rceil.$$

For example, if the value of the rank of the transmission layer belongs to {1, 2}, the same function F( ) is selected. If the rank of the transmission layer belongs to {3, 4}, another function F( ) is selected.

For example, if the value of the rank RI belongs to {1, 2}, the function satisfying that $$F()=\left\lceil\beta\times2L\left\lceil p\times\frac{N_3}{R}\right\rceil\right\rceil$$

may be selected. If the value of the rank RI belongs to {3, 4}, the function satisfying that $$F()=\left\lceil\beta\times2L\left\lceil a_{RI}\times p\times\frac{N_3}{R}\right\rceil\right\rceil,$$

the function satisfying that $$F()=\left\lceil\beta\times2\times a_{RI}\times L\left\lceil p\times\frac{N_3}{R}\right\rceil\right\rceil$$

and the function satisfying that $$F()=\left\lceil a_{RI}\times\beta\times2L\left\lceil p\times\frac{N_3}{R}\right\rceil\right\rceil$$

may be selected. One or more of parameters L, p and β may be independently configured according to the value of the rank RI, and the preset upper limit value of the feedback number is determined by using the function satisfying that $$F()=\left\lceil\beta\times2L\left\lceil p\times\frac{N_3}{R}\right\rceil\right\rceil.$$

After the preset upper limit value of the feedback number is determined by using the function F( ), the parameter $K_0$ of the rank RI may be determined according to the following formula:

$$K_{0,RI}=\max(F(\ ),A).$$

The parameter $K_0$ of the rank RI is marked as $K_{0,RI}$. The above formula represents that a relatively large one is selected from the result of the function F( ) (the preset upper limit value of the feedback number) and the preset upper limit value A of the feedback number, so that $K_{0,RI}$ can be avoided from being two small. In other words, too few coefficients in the matrix C to be fed back will result in lower accuracy of the feedback precoding, that is, through the above formula, the accuracy of the precoding can be ensured.

In some embodiments, the preset upper limit value A of the feedback number includes a positive integer determined by the rank RI of the transmission layer. Of course, the preset upper limit value A of the feedback number may alternatively be a positive integer determined independently of the rank, the preset upper limit value A of the feedback number may be configured by the base station for the terminal device, or the preset upper limit value A of the feedback number may be determined by the terminal device according to the protocol of the precoding.

In some embodiments, the preset upper limit value A of the feedback number may be fixed at a positive integer. For example, the preset upper limit value A of the feedback number is fixed at 1 and does not change with the rank, so that the value of $K_{0,RI}$ is prevented from being zero, that is, the situation of no coefficient being fed back is avoided. For another example, the preset upper limit value A of the feedback number is fixed at 2, which can ensure that at least two coefficients in the coefficient matrix are fed back, and ensure the minimum feedback accuracy of the precoding.

In some embodiments, at least one control parameter for determining the upper limit value $K_0$ of the feedback number may be modified in the present disclosure. For example, at least one of the number L of space domain vectors or the number M of frequency domain vectors is modified. An embodiment includes at least one of the followings.

First, the number of space domain vectors corresponding to a first class of rank of the transmission layer of the precoding is calculated by using a first proportional function, and the calculation result is rounded down to obtain the number of space domain vectors corresponding to a second class of rank of the transmission layer of the precoding.

Second, the number of frequency domain vectors corresponding to the first class of rank of the transmission layer of the precoding is calculated by using a second proportional function, and the calculation result is rounded down to obtain the number of frequency domain vectors corresponding to the second class of rank of the transmission layer of the precoding.

In some embodiments, since the above-determined is the number of frequency domain vectors corresponding to the second class of rank, a coefficient of the first proportional function may include a positive number determined by the second class of rank of the transmission layer of the precoding, and a coefficient of the second proportional function may include a positive number determined by the second class of rank of the transmission layer of the precoding. In some embodiments, the coefficients of the above proportional functions may be not determined with the rank, and each may be configured with a fixed value determined according to the protocol or by the base station. In the embodiment, proportional functions and a round-down function are used to ensure that the number of frequency domain vectors is a positive integer.

In the embodiments of the present disclosure, the first and the second do not indicate a specific arrangement relationship, and the rank of the transmission layer in the embodiments of the present disclosure does not only limit the division of all ranks into the first class of rank and the second class of rank. The ranks can also be divided into multiple classes of ranks. The first class of rank and the second class of rank are merely expressed as different ranges of the included ranks. If the ranks are divided into multiple classes, the following case may be included: for any two classes of ranks, the number of space domain vectors and/or the number of frequency domain vectors corresponding to one class of rank can be calculated based on the number of space domain vectors and/or the number of frequency domain vectors corresponding to another class of rank.

The following examples describe the modification process of the number L of space domain vectors and the number M of frequency domain vectors.

In a case where the rank RI of the transmission layer is a, the number of space domain vectors and the number of frequency domain vectors may be marked as ($L_a$, $M_a$), where a is 1 or 2.

In a case where the rank RI of the transmission layer is b, the number of space domain vectors and the number of frequency domain vectors may be marked as ($L_b$, $M_b$), where b is an integer greater than 2.

($L_b$, $M_b$) may be determined by following formulas:

$$L_b = \text{floor}(f_1(L_a));$$

$$M_b = \text{floor}(f_2(M_a)).$$

$f_1(\ )$ represents the first proportional function, for example, $f_1(\ ) = d_{1,RI} L_a$. The coefficient $d_{1,RI}$ is a positive number determined according to the rank RI or a positive number independently configured according to RI. $f_2(\ )$ represents the second proportional function, for example, $f_2(\ ) = d_{2,RI} M_a$. The coefficient $d_{2,RI}$ is a positive number determined according to the rank RI or a positive number independently configured according to RI. floor represents a round-down function.

In the embodiment, the function satisfying that $L_b = \text{floor}(f_1(L_a))$ may be adopted to modify the number L of space domain vectors or the function satisfying that $M_b = \text{floor}(f_2(M_a))$ may be adopted to modify the number M of frequency domain vectors, or the function satisfying that $L_b = \text{floor}(f_1(L_a))$ and the function satisfying that $M_b = \text{floor}(f_2(M_a))$ are adopted simultaneously to respectively modify the number L of space domain vectors and the number M of frequency domain vectors.

In the embodiment, the number L of space domain vectors in case that the rank is greater than 2 or the number M of frequency domain vectors in case that the rank is greater than 2 is rounded down, so that the effect that the feedback overhead will not increase due to rounding is achieved, that is, the effect of reducing the feedback overhead is achieved.

In some embodiments, at least one configuration parameter or at least one control parameter for determining the upper limit value of the feedback number may be modified in the present disclosure. For example, one or more of the number L of space domain vectors, the number M of frequency domain vectors, the influence parameter p of the number of frequency domain vectors and the influence parameter β of the upper limit value of the feedback number of the coefficients in the coefficient matrix are modified as described below.

First, the number of space domain vectors corresponding to the first class of rank of the transmission layer of the precoding is calculated by using a first proportional function, and one with a relatively large value is selected from the calculation result and a preset value of the number of space domain vectors as the number of space domain vectors corresponding to the second class of rank of the transmission layer of the precoding.

Second, the number of frequency domain vectors corresponding to the first class of rank of the transmission layer of the precoding is calculated by using a second proportional function, and one with a relatively large value is selected from the calculation result and a preset value of the number of frequency domain vectors as the number of frequency domain vectors corresponding to the second class of rank of the transmission layer of the precoding.

Third, an influence parameter of the number of frequency domain vectors corresponding to the first class of rank of the transmission layer of the precoding is calculated by using a third proportional function, and one with a relatively large value is selected from the calculation result and a preset value of a first influence parameter as an influence parameter of the number of frequency domain vectors corresponding to the second class of rank of the transmission layer of the precoding.

Fourth, an influence parameter of the upper limit value of the feedback number corresponding to the first class of rank of the transmission layer of the precoding is calculated by using a fourth proportional function, and one with a relatively large value is selected from the calculation result and a preset value of a second influence parameter as an influence parameter of the upper limit value of the feedback number corresponding to the second class of rank of the transmission layer of the precoding.

In the embodiment, the first proportional function in the embodiment may be different from the first proportional function involved in the above embodiments. The second proportional function in the embodiment may be different from the second proportional function involved in the above embodiments. Any one of a coefficient of the first proportional function, a coefficient of the second proportional function, a coefficient of the third proportional function and a coefficient of the fourth proportional function may be a positive number determined by the second class of rank of the transmission layer of the precoding, or may be a positive number independent of the rank RI.

The preset value $A_L$ of the number of space domain vectors, the preset value $A_M$ of the number of frequency domain vectors, the preset value $A_p$ of the first influence parameter and the preset value $A_β$ of the second influence parameter are all positive integers.

In some embodiments, the preset value $A_L$ of the number of space domain vectors may be determined according to the second class of rank of the transmission layer of the precoding, or may be independent of RI; the preset value $A_L$ of the number of space domain vectors may be predetermined by the terminal device according to the protocol of the precoding, or may be configured by the base station for the terminal device.

In some embodiments, the preset value $A_M$ of the number of frequency domain vectors may be determined according to the second class of rank of the transmission layer of the precoding, or may be independent of RI; the preset value $A_M$ of the number of frequency domain vectors may be predetermined by the terminal device according to the protocol of the precoding, or may be configured by the base station for the terminal device.

In some embodiments, the preset value $A_p$ of the first influence parameter may be determined according to the second class of rank of the transmission layer of the precoding, or may be independent of RI; the preset value $A_p$ of the first influence parameter may be predetermined by the terminal device according to the protocol of the precoding, or may be configured by the base station for the terminal device.

The following examples describe the modification process of the number L of space domain vectors, the number M of frequency domain vectors, the influence parameter p of the number of frequency domain vectors and the influence parameter β of the upper limit value of the feedback number of the coefficients in the coefficient matrix.

In a case where the rank RI of the transmission layer is a, the number of space domain vectors, the number of frequency domain vectors, the influence parameter of the number of frequency domain vectors, and the influence parameter of the upper limit value of the feedback number of the coefficients in the coefficient matrix may be marked as ($L_a$, $M_a$, $p_a$, $\beta_a$), where a is 1 or 2.

In a case where the rank RI of the transmission layer is b, the number of space domain vectors, the number of frequency domain vectors, the influence parameter of the number of frequency domain vectors, and the influence parameter of the upper limit value of the feedback number of the coefficients in the coefficient matrix may be marked as ($L_b$, $M_b$, $p_b$, $\beta_b$), where b is an integer greater than 2.

($L_b$, $M_b$, $p_b$, $\beta_b$) may be determined by following formulas:

$$L_b = \max(f_1(L_a), A_L);$$

$$M_b = \max(f_2(M_a), A_M);$$

$$p_b = \max(f_3(p_a), A_p);$$

$$\beta_b = \max(f_4(\beta_a), A_\beta).$$

$f_1(\ )$ represents the first proportional function, for example, $f_1(\ ) = d_{1,RI} L_a$. The coefficient $d_{1,RI}$ may be a positive number determined according to the rank RI or a positive number configured independent of RI. $f_2(\ )$ represents the second proportional function, for example, $f_2(\ ) = d_{2,RI} M_a$. The coefficient $d_{2,RI}$ is a positive number determined according to the rank RI or a positive number configured independent of RI. $f_3(\ )$ represents the third proportional function, for example, $f_3(\ ) = d_{3,RI} p_a$. The coefficient $d_{3,RI}$ may be a positive number determined according to the rank RI or a positive number configured independent of RI. $f_4(\ )$ represents the fourth proportional function, for example, $f_4(\ ) = d_{4,RI} \beta_a$.

In some embodiments, other functions such as linear functions may be used to replace the above proportional functions, as long as the obtained calculation result of the functions based on any input is at least a positive integer value that is not zero.

In the embodiment, one or more of the functions among the above formulas may be adopted to correspondingly modify one or more of the parameters ($l_b$, $M_b$, $p_b$, $\beta_b$). The formula corresponding to each parameter among the above formulas uses the max function to select the relatively large one, where one element in the max function is a preset positive integer value. In this way, the minimum feedback accuracy of the precoding can be ensured, and at the same time, the occurrence of no feedback can be avoided.

In some embodiments, at least one configuration parameter for determining the upper limit value of the feedback number may be modified in the present disclosure. For example, one or more of the number L of space domain vectors, the influence parameter p of the number of frequency domain vectors and the influence parameter $\beta$ of the upper limit value of the feedback number of the coefficients in the coefficient matrix are modified. In the embodiment, value ranges of one or more of the parameters (L, p, $\beta$) may be determined based on the rank of the precoding. For example, value sets are described below.

First, a value range of the number of space domain vectors is determined based on the rank of the transmission layer of the precoding.

Second, a value range of the influence parameter of the number of frequency domain vectors is determined based on the rank of the transmission layer of the precoding.

Third, a value range of the influence parameter of the upper limit value of the feedback number is determined based on the rank of the transmission layer of the precoding.

In some embodiments, after the value range is determined, parameter values may be selected from the value range for configuration.

In some embodiments, in a case where ranks belong to the same class of rank, value ranges may be the same. For example, in a case where RI=1 and in a case where RI=2, the numbers L of space domain vectors share one value set. For another example, in a case where RI=1 and in a case where RI=2, the numbers L of space domain vectors share another value set. Alternatively, different RIs use different value sets. Examples may include but are not limited to Tables 1 to 12 shown below.

TABLE 1

| | RI = 1 | RI = 2 | RI = 3 | RI = 4 |
|---|---|---|---|---|
| Value sets of L | {2, 4, 6} | {2, 4, 6} | {2, 4, 6} | {2, 4} |

TABLE 2

| | RI = 1 | RI = 2 | RI = 3 | RI = 4 |
|---|---|---|---|---|
| Value sets of L | {2, 4, 6} | {2, 4, 6} | {2, 4} | {2, 4} |

TABLE 3

| | RI = 1 | RI = 2 | RI = 3 | RI = 4 |
|---|---|---|---|---|
| Value sets of L | {2, 4} | {2, 4} | {2} | {2} |

TABLE 4

| | RI = 1 | RI = 2 | RI = 3 | RI = 4 |
|---|---|---|---|---|
| Value sets of L | {2, 3, 4, 6} | {2, 3, 4} | {2, 3} | {2} |

TABLE 5

| | RI = 1 | RI = 2 | RI = 3 | RI = 4 |
|---|---|---|---|---|
| Value sets of L | {2, 3, 4, 6} | {2, 4} | {2, 3} | {2} |

TABLE 6

| | RI = 1 | RI = 2 | RI = 3 | RI = 4 |
|---|---|---|---|---|
| Value sets of p | $\{\frac{1}{4}, \frac{1}{2}\}$ | $\{\frac{1}{4}, \frac{1}{2}\}$ | $\{\frac{1}{8}, \frac{1}{4}\}$ | $\{\frac{1}{8}, \frac{1}{4}\}$ |

TABLE 7

| | RI = 1 | RI = 2 | RI = 3 | RI = 4 |
|---|---|---|---|---|
| Value sets of p | $\{\frac{1}{4}, \frac{1}{2}\}$ | $\{\frac{1}{4}, \frac{1}{2}\}$ | $\{\frac{1}{8}, \frac{1}{4}\}$ | $\{\frac{1}{8}\}$ |

TABLE 8

| | RI = 1 | RI = 2 | RI = 3 | RI = 4 |
|---|---|---|---|---|
| Value sets of p | $\{\frac{1}{4}, \frac{1}{2}\}$ | $\{\frac{1}{4}, \frac{1}{2}\}$ | $\{\frac{1}{8}\}$ | $\{\frac{1}{8}\}$ |

TABLE 9

| | RI = 1 | RI = 2 | RI = 3 | RI = 4 |
|---|---|---|---|---|
| Value sets of β | $\{\frac{1}{4}, \frac{1}{2}, \frac{3}{4}\}$ | $\{\frac{1}{4}, \frac{1}{2}, \frac{3}{4}\}$ | $\{\frac{1}{4}, \frac{1}{2}\}$ | $\{\frac{1}{4}, \frac{1}{2}\}$ |

TABLE 10

| | RI = 1 | RI = 2 | RI = 3 | RI = 4 |
|---|---|---|---|---|
| Value sets of β | $\{\frac{1}{4}, \frac{1}{2}, \frac{3}{4}\}$ | $\{\frac{1}{4}, \frac{1}{2}, \frac{3}{4}\}$ | $\{\frac{1}{4}, \frac{1}{2}, \frac{3}{4}\}$ | $\{\frac{1}{4}, \frac{1}{2}\}$ |

TABLE 11

| | RI = 1 | RI = 2 | RI = 3 | RI = 4 |
|---|---|---|---|---|
| Value sets of β | $\{\frac{1}{4}, \frac{1}{2}, \frac{3}{4}\}$ | $\{\frac{1}{4}, \frac{1}{2}, \frac{3}{4}\}$ | $\{\frac{1}{4}, \frac{1}{2}\}$ | $\{\frac{1}{4}\}$ |

TABLE 12

| | RI = 1 | RI = 2 | RI = 3 | RI = 4 |
|---|---|---|---|---|
| Value sets of β | $\{\frac{1}{4}, \frac{1}{2}, \frac{3}{4}\}$ | $\{\frac{1}{4}, \frac{1}{2}, \frac{3}{4}\}$ | $\{\frac{1}{4}\}$ | $\{\frac{1}{4}\}$ |

In some embodiments, the upper limit value of the feedback number may be modified based on the number of frequency domain vectors. It is included that the value range of the influence parameter of the upper limit value of the feedback number is determined based on the number of frequency domain vectors. For example, M=1, and the value of β is $\{\frac{1}{2}, \frac{3}{4}\}$;

or, M=1, and the value of β cannot be ¼. Other examples may be shown as Tables 13 and 14.

TABLE 13

| | M = 1 | M > 1 |
|---|---|---|
| Value sets of β | $\{\frac{1}{2}, \frac{3}{4}\}$ | $\{\frac{1}{4}, \frac{1}{2}, \frac{3}{4}\}$ |

TABLE 14

| | M = 1 | M = 2 | M > 2 |
|---|---|---|---|
| Value sets of β | $\{\frac{3}{4}\}$ | $\{\frac{1}{2}, \frac{3}{4}\}$ | $\{\frac{1}{4}, \frac{1}{2}, \frac{3}{4}\}$ |

In some embodiments, the method provided by the present disclosure further includes: the control parameters of the precoding are determined in the modification process. The control parameters include the number of space domain vectors, the number of frequency domain vectors and the upper limit value of the feedback number. Since the related configuration parameters or control parameters that affect the upper limit value of the feedback number are modified, other control parameters can be updated after the modification, or a corresponding control parameter may be adjusted by using an updated configuration parameter. For example, in a case where the parameter p is modified, the number M of frequency domain vectors can be modified by using the modified parameter p.

Figure 3:
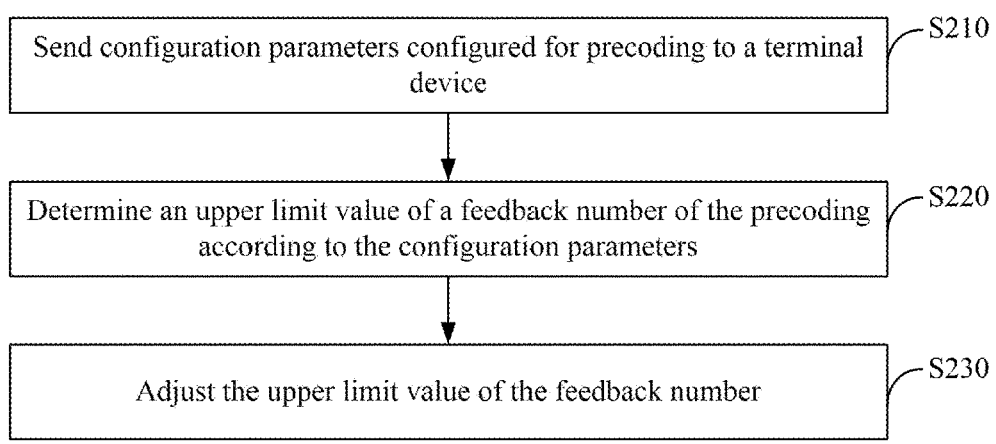
FIG. 3 is a flowchart of a method for controlling precoding according to another embodiment of the present disclosure.

Referring to FIG. 3, the present disclosure further provides a method for controlling precoding. The method may be applied to a base station and includes steps S210 to S230.

In step S210, configuration parameters configured for precoding is sent to a terminal device. The precoding is used for feeding back a channel state. The configuration parameters may include the following of the precoding: the number of space domain vectors, an influence parameter of the number of frequency domain vectors and frequency domain information of the number of frequency domain vectors, and an influence parameter of an upper limit value of the feedback number of coefficients in a coefficient matrix.

In step S220, the upper limit value of the feedback number of coefficients of composition vectors of the precoding is determined according to the configuration parameters.

In step S230, the upper limit value of the feedback number is adjusted.

In some embodiments, adjusting in step S230 includes at least one of steps described below.

First, the upper limit value of the feedback number is modified.

Second, at least one configuration parameter or at least one control parameter that affects the upper limit value of the feedback number is modified, and the upper limit value of the feedback number is modified by using the modified parameter.

In the embodiment of the present disclosure, the modification and the modification effect of the upper limit value of the feedback number are the same as described in the above embodiments, and will not be repeated herein.

In some embodiments, the method for controlling precoding applied to the base station further includes: the precoding sent by the terminal device is received; and the precoding is evaluated according to the adjusted upper limit value of the feedback number.

In some embodiments, the adjustment of the upper limit value of the feedback number may include the modification of at least one configuration parameter or at least one control parameter that affects the upper limit value of the feedback number, so the modification process may involve other control parameters. In the present disclosure, the control parameters as described above include the three ones: the number of space domain vectors, the number of frequency domain vectors and the upper limit value of the feedback number. These three control parameters can control the generation of the precoding. Therefore, the base station may execute the following operations: the control parameters of the precoding are determined in the adjustment process of the upper limit value of the feedback number; the precoding is evaluated according to the currently determined control parameters after the precoding sent by the terminal device is received.

In the embodiment of the present disclosure, the process and effect of determining the upper limit value of the feedback number of the coefficients of the composition vectors of the precoding and adjusting the upper limit value of the feedback number are the same as described in the above embodiments, and will not be repeated herein.

Figure 4:
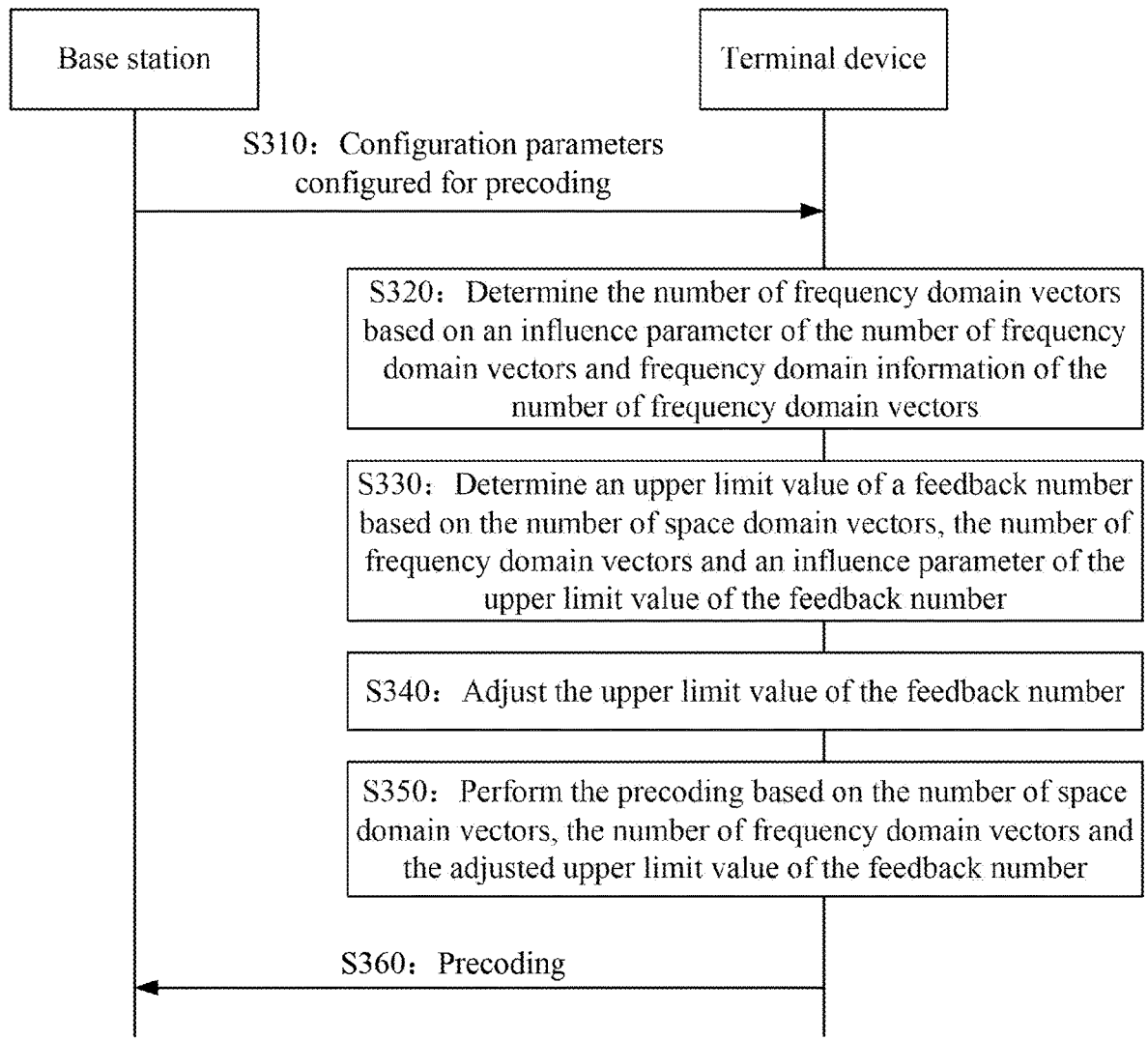
FIG. 4 is a schematic diagram of an interaction between a terminal device and a base station according to an embodiment of the present disclosure.

Referring to FIG. 4, a method for an interaction between a terminal device and a base station is provided according to an embodiment of the present disclosure. The method includes steps described below.

In step S310, a base station sends configuration parameters configured for precoding to a terminal device. The configuration parameters include the number of space domain vectors, an influence parameter of the number of frequency domain vectors, an influence parameter of an upper limit value of the feedback number of coefficients in a coefficient matrix, and frequency domain information of the number of frequency domain vectors.

In step S320, after receiving the configuration parameters, the terminal device determines the number of frequency domain vectors based on the influence parameter of the number of frequency domain vectors and the frequency domain information of the number of frequency domain vectors.

In step S330, the terminal device determines the upper limit value of the feedback number based on the number of space domain vectors, the number of frequency domain vectors and the influence parameter of the upper limit value of the feedback number.

In step S340, the terminal device adjusts the upper limit value of the feedback number.

In step S350, the terminal device performs the precoding based on the number of space domain vectors, the number of frequency domain vectors and the adjusted upper limit value of the feedback number.

In step S360, the terminal device sends the precoding to the base station.

In the embodiment of the present disclosure, the modification and the modification effect of the upper limit value of the feedback number are the same as described in the above embodiments, and will not be repeated herein.

Figure 5:
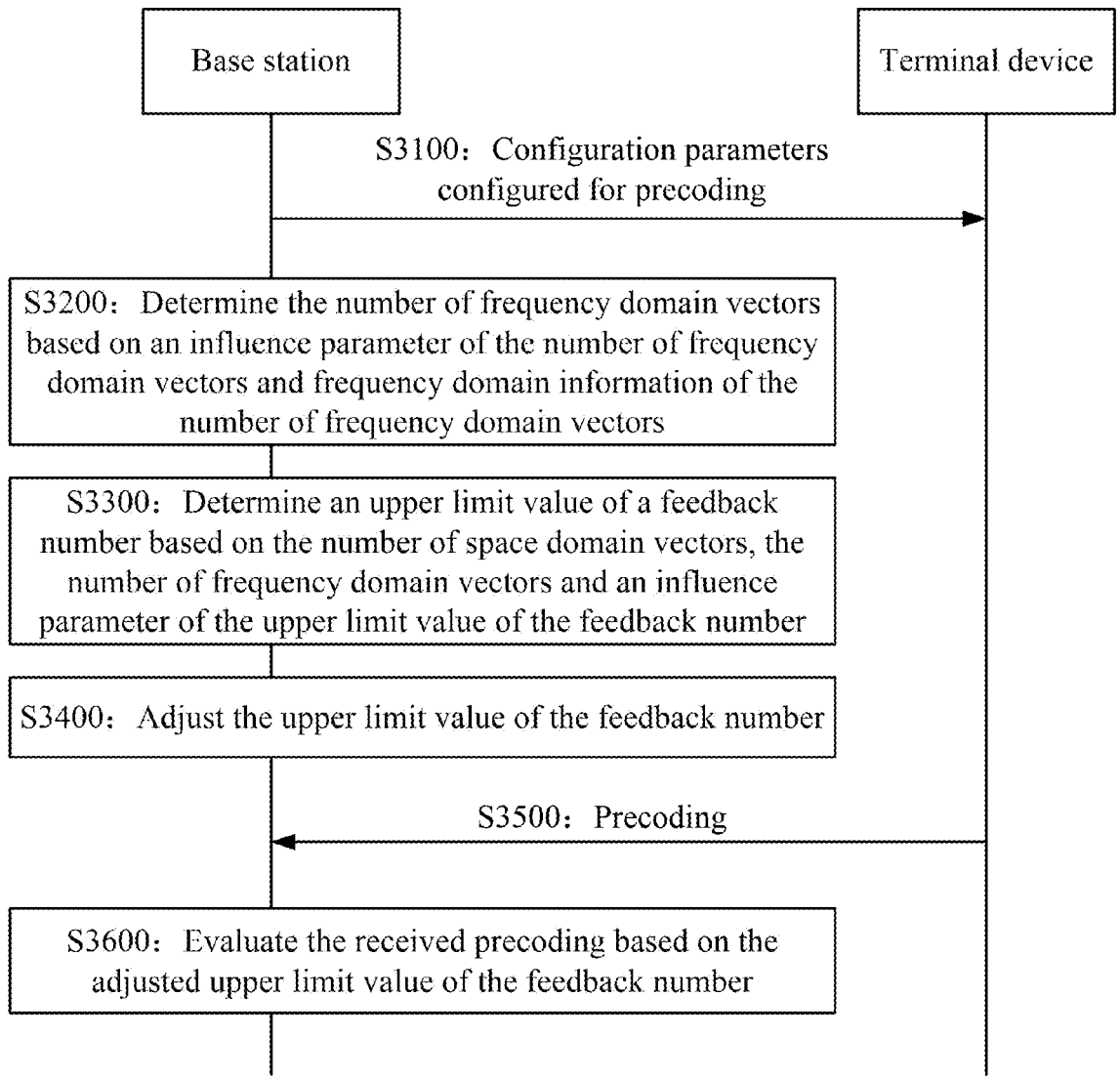
FIG. 5 is a schematic diagram of an interaction between a terminal device and a base station according to another embodiment of the present disclosure.

Referring to FIG. 5, a method for an interaction between a terminal device and a base station is provided according to an embodiment of the present disclosure. The method includes steps described below.

In step S3100, a base station sends configuration parameters configured for precoding to a terminal device. The configuration parameters include the number of space domain vectors, an influence parameter of the number of frequency domain vectors, an influence parameter of an upper limit value of a feedback number of coefficients in a coefficient matrix, and frequency domain information of the number of frequency domain vectors.

In step S3200, after sending the configuration parameters, the base station determines the number of frequency domain vectors based on the influence parameter of the number of frequency domain vectors and the frequency domain information of the number of frequency domain vectors.

In step S3300, the base station determines the upper limit value of the feedback number based on the number of space domain vectors, the number of frequency domain vectors and the influence parameter of the upper limit value of the feedback number.

In step S3400, the base station adjusts the upper limit value of the feedback number.

In step S3500, the terminal device sends the precoding to the base station.

In step S3600, the base station evaluates the received precoding based on the adjusted upper limit value of the feedback number.

In the embodiment of the present disclosure, the modification and the modification effect of the upper limit value of the feedback number are the same as described in the above embodiments, and will not be repeated herein.

Figure 6:
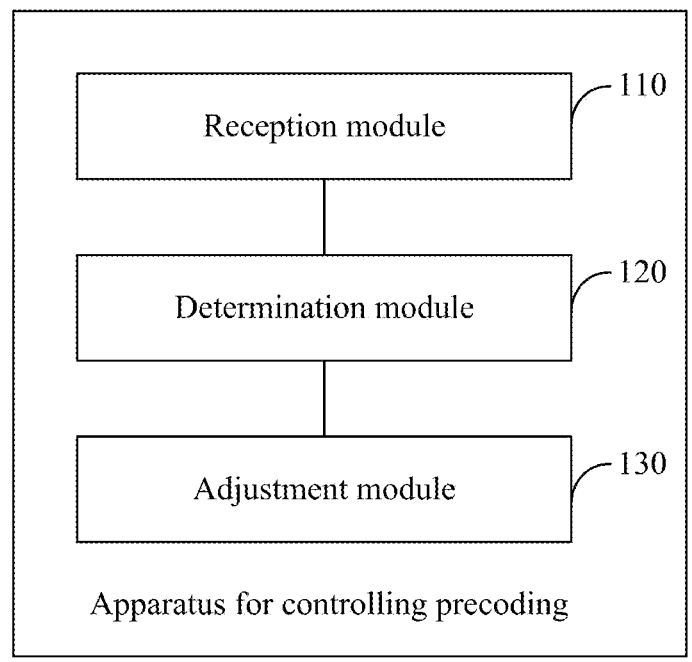
FIG. 6 is a flowchart of an apparatus for controlling precoding according to an embodiment of the present disclosure.

Referring to FIG. 6, an apparatus for controlling precoding is provided according to an embodiment of the present disclosure. The apparatus includes a reception module 110, a determination module 120 and an adjustment module 130.

The reception module 110 is configured to receive configuration parameters configured by a base station for precoding, where the precoding is used for feeding back a channel state.

The determination module 120 is configured to determine, according to the configuration parameters, an upper limit value of a feedback number of coefficients of composition vectors of the precoding.

The adjustment module 130 is configured to adjust the upper limit value of the feedback number.

In some embodiments, the adjustment module 130 includes at least one of a first modification unit or a second modification unit.

The first modification unit is configured to modify the upper limit value of the feedback number.

The second modification module is configured to modify at least one configuration parameter or at least one control parameter that affects the upper limit value of the feedback number, and modify the upper limit value of the feedback number by using the modified parameter.

In some embodiments, the first modification unit is specifically configured to select one with a relatively large value from the upper limit value of the feedback number and a preset upper limit value of the feedback number as the upper limit value of the feedback number.

In some embodiments, the first modification unit includes an upper limit value adjustment subunit and a maximum value selection subunit.

The upper limit value adjustment subunit is configured to adjust, according to a rank of a transmission layer of the precoding, an upper limit value of the feedback number corresponding to the rank of the transmission layer.

The maximum value selection subunit is configured to select one with a relatively large value from the adjusted upper limit value of the feedback number and a preset upper limit value of the feedback number as the upper limit value of the feedback number corresponding to the rank of the transmission layer.

In some embodiments, the preset upper limit value of the feedback number includes a positive integer determined by the rank of the transmission layer.

In some embodiments, control parameters that affect the upper limit value of the feedback number include the number of space domain vectors and the number of frequency domain vectors of the precoding. The second modification unit includes a first calculation subunit and a second calculation subunit.

The first calculation subunit is configured to calculate the number of space domain vectors corresponding to a first class of rank of the transmission layer of the precoding by using a first proportional function, and round the calculation result down to obtain the number of space domain vectors corresponding to a second class of rank of the transmission layer of the precoding.

The second calculation subunit is configured to calculate the number of frequency domain vectors corresponding to the first class of rank of the transmission layer of the precoding by using a second proportional function, and round the calculation result down to obtain the number of frequency domain vectors corresponding to the second class of rank of the transmission layer of the precoding.

In some embodiments, the control parameters that affect the upper limit value of the feedback number include the number of space domain vectors and the number of frequency domain vectors of the precoding, the configuration parameters include the number of space domain vectors, an influence parameter of the number of frequency domain vectors and an influence parameter of the upper limit value of the feedback number. The second modification unit includes at least one of a third calculation subunit, a fourth calculation subunit, a fifth calculation subunit or a sixth calculation subunit.

The third calculation subunit is configured to calculate the number of space domain vectors corresponding to the first class of rank of the transmission layer of the precoding by using a first proportional function, and select one with a relatively large value from the calculation result and a preset value of the number of space domain vectors as the number of space domain vectors corresponding to the second class of rank of the transmission layer of the precoding.

The fourth calculation subunit is configured to calculate the number of frequency domain vectors corresponding to the first class of rank of the transmission layer of the precoding by using a second proportional function, and select one with a relatively large value from the calculation result and a preset value of the number of frequency domain vectors as the number of frequency domain vectors corresponding to the second class of rank of the transmission layer of the precoding.

The fifth calculation subunit is configured to calculate an influence parameter of the number of frequency domain vectors corresponding to the first class of rank of the transmission layer of the precoding by using a third proportional function, and select one with a relatively large value from the calculation result and a preset value of a first influence parameter as an influence parameter of the number of frequency domain vectors corresponding to the second class of rank of the transmission layer of the precoding.

The sixth calculation subunit is configured to calculate an influence parameter of an upper limit value of a feedback number corresponding to the first class of rank of the transmission layer of the precoding by using a fourth proportional function, and select one with a relatively large value from the calculation result and a preset value of a second influence parameter as an influence parameter of an upper limit value of a feedback number corresponding to the second class of rank of the transmission layer of the precoding.

In some embodiments, coefficients of the proportional functions include positive numbers determined by the second class of rank of the transmission layer of the precoding.

In some embodiments, the first class of rank represents a rank of 1 or 2, and the second class of rank represents a rank of being greater than 2.

In some embodiments, the preset value of the number of space domain vectors includes a positive integer determined by the second class of rank of the transmission layer of the precoding, the preset value of the number of frequency domain vectors includes a positive integer determined by the second class of rank of the transmission layer of the precoding, the preset value of the first influence parameter includes a positive integer determined by the second class of rank of the transmission layer of the precoding, or the preset value of the second influence parameter includes a positive integer determined by the second class of rank of the transmission layer of the precoding.

In some embodiments, the configuration parameters include the number of space domain vectors, an influence parameter of the number of frequency domain vectors and an influence parameter of the upper limit value of the feedback number. The second modification unit includes at least one of a first determination subunit, a second determination subunit or a third determination subunit.

The first determination subunit is configured to determine, based on the rank of the transmission layer of the precoding, a value range of the number of space domain vectors.

The second determination subunit is configured to determine, based on the rank of the transmission layer of the precoding, a value range of the influence parameter of the number of frequency domain vectors.

The third determination subunit is configured to determine, based on the rank of the transmission layer of the precoding, a value range of the influence parameter of the upper limit value of the feedback number.

In some embodiments, the control parameters that affect the upper limit value of the feedback number include the number of frequency domain vectors of the precoding. The second modification unit includes a fourth determination subunit.

The fourth determination subunit is configured to determine, based on the number of frequency domain vectors, a value range of the influence parameter of the upper limit value of the feedback number.

In some embodiments, the apparatus further includes a control parameter determination unit, a precoding generation unit and a sending unit.

The control parameter determination unit is configured to determine control parameters of the precoding in the process of adjustment, where the control parameters include the number of space domain vectors of the precoding, the number of frequency domain vectors of the precoding and the upper limit value of the feedback number of the precoding.

The precoding generation unit is configured to generate the precoding according to the control parameters.

The sending unit is configured to send the precoding to the base station.

Figure 7:
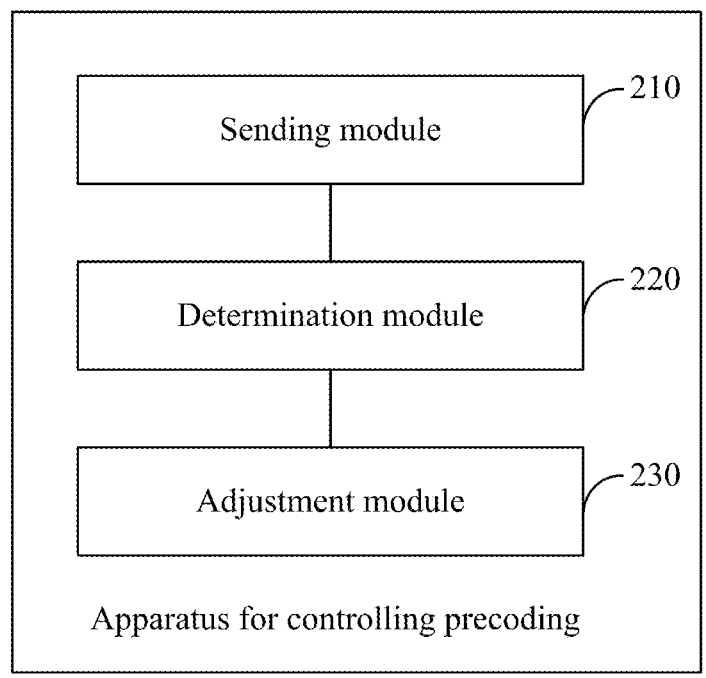
FIG. 7 is a flowchart of an apparatus for controlling precoding according to another embodiment of the present disclosure.

Referring to FIG. 7, an apparatus for controlling precoding is provided according to an embodiment of the present disclosure. The apparatus includes a sending module 210, a determination module 220 and an adjustment module 230.

The sending module 210 is configured to send configuration parameters configured for precoding to a terminal device, where the precoding is used for feeding back a channel state.

The determination module 220 is configured to determine, according to the configuration parameters, an upper limit value of a feedback number of coefficients of composition vectors of the precoding.

The adjustment module 230 is configured to modify the upper limit value of the feedback number.

In some embodiments, the adjustment module 230 includes at least one of a first modification unit or a second modification unit.

The first modification unit is configured to modify the upper limit value of the feedback number.

The second modification module is configured to modify at least one configuration parameter or at least one control parameter that affects the upper limit value of the feedback number, and modify the upper limit value of the feedback number by using the modified parameter.

In some embodiments, the apparatus further includes a reception module and an evaluation module.

The reception module is configured to receive the precoding sent by a terminal device.

The evaluation module is configured to evaluate, according to the adjusted upper limit value of the feedback number, the precoding.

In the embodiment of the present disclosure, structures and functions of the determination module 220 and the adjustment module 230 are the same as described in the above embodiments, and will not be repeated herein.

Figure 8:
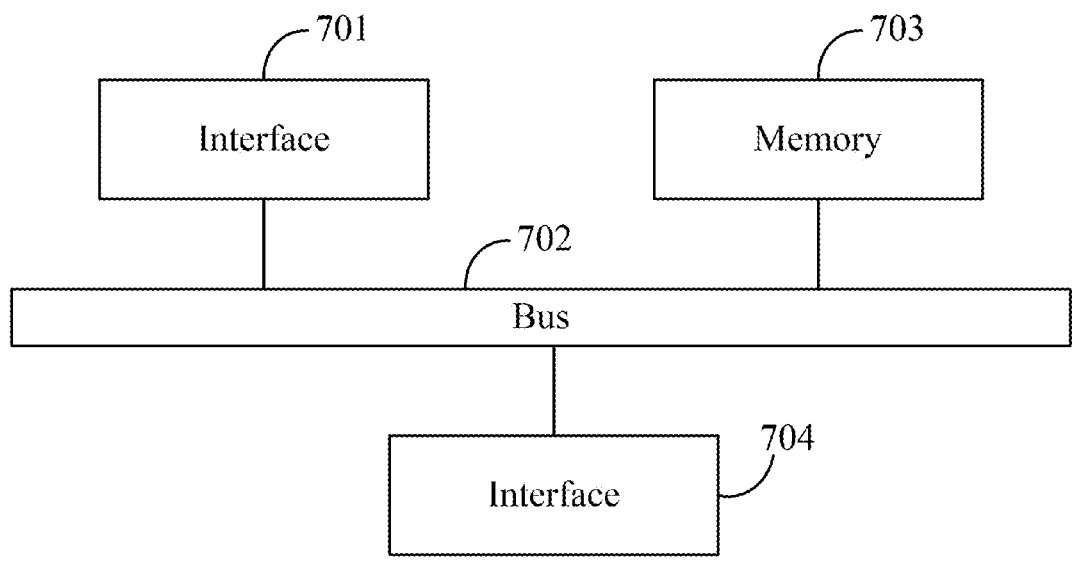
FIG. 8 is a structural diagram of a terminal device for controlling precoding according to an embodiment of the present disclosure.

FIG. 8 is a structural diagram of a terminal device for controlling precoding according to an embodiment of the present disclosure. As shown in FIG. 8, the terminal device 70 provided by the embodiment of the present disclosure includes a memory 703 and a processor 704. The terminal device 70 may further include an interface 701 and a bus 702. The interface 701, the memory 703 and the processor 704 are connected through the bus 702. The memory 703 is configured to store instructions. The processor 704 is configured to read the instructions to execute the technical solutions of the above method embodiments applied to the terminal device. The implementation principles and technical effects are similar, which are not repeated herein.

Figure 9:
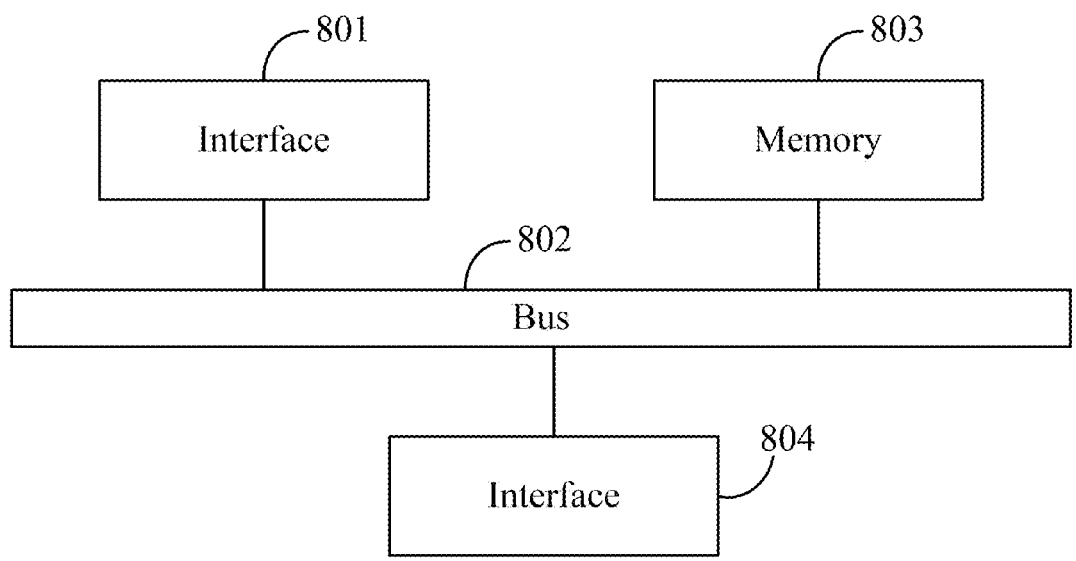
FIG. 9 is a structural diagram of a base station for controlling precoding according to an embodiment of the present disclosure.

FIG. 9 is a structural diagram of a base station for controlling precoding according to an embodiment of the present disclosure. As shown in FIG. 9, the base station 80 provided by the embodiment of the present disclosure includes a memory 803 and a processor 804. The base station 80 may further include an interface 801 and a bus 802. The interface 801, the memory 803 and the processor 804 are connected through the bus 802. The memory 803 is configured to store instructions. The processor 804 is configured to read the instructions to execute the technical solutions of the above method embodiments applied to the base station. The implementation principles and technical effects are similar, which are not repeated herein.

Figure 10:
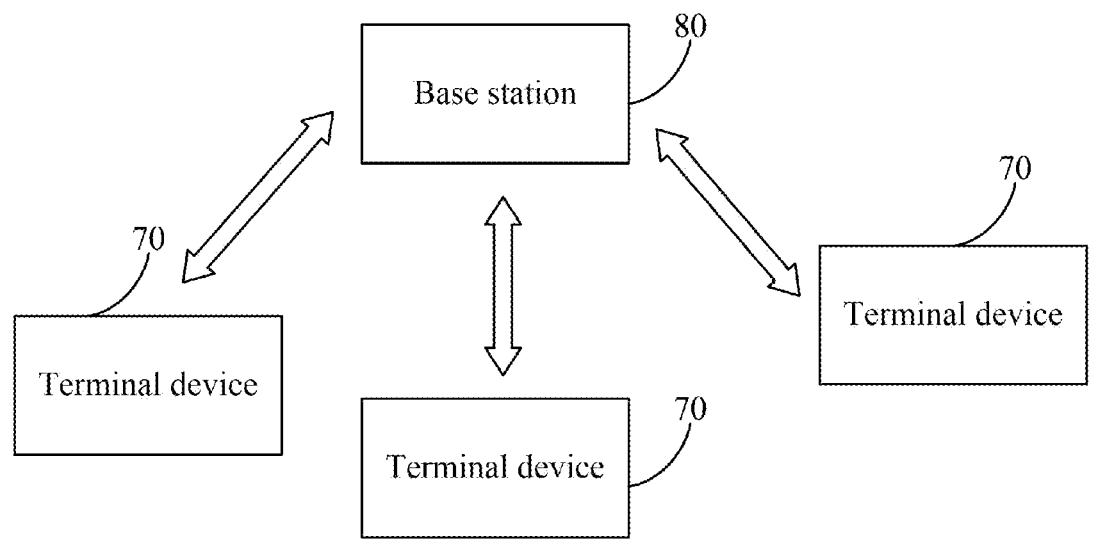
FIG. 10 is a structural diagram of a system for controlling precoding according to an embodiment of the present disclosure.

FIG. 10 is a structural diagram of a communication system according to an embodiment of the present disclosure. As shown in FIG. 10, the system includes the terminal device 70 of the above embodiment and the base station 80 of the above embodiment.

A storage medium is provided in the present disclosure. The storage medium is configured to store computer programs which, when executed by a processor, implement the method of the above embodiments.

The above are only exemplary embodiments of the present disclosure and are not intended to limit the scope of the present disclosure.

It is to be understood by those skilled in the art that the term user terminal encompasses any suitable type of wireless user device such as a mobile phone, a portable data processing apparatus, a portable web browser or a vehicle-mounted mobile station.

Generally, various embodiments of the present disclosure may be implemented in hardware, special-purpose circuitry, software, logics or any combination thereof. For example, some aspects may be implemented in hardware while other aspects may be implemented in firmware or software executable by a controller, a microprocessor or other computing apparatuses, although the present disclosure is not limited thereto.

The embodiments of the present application may be implemented through the execution of computer program instructions by a data processor of a mobile apparatus, for example, implemented in a processor entity, hardware or a combination of software and hardware. The computer program instructions may be assembly instructions, instruction set architecture (ISA) instructions, machine instructions, machine-related instructions, microcodes, firmware instructions, status setting data, or source codes or object codes written in any combination of one or more programming languages.

A block diagram of any logic flow among the drawings of the present disclosure may represent program steps, or may represent interconnected logic circuits, modules and functions, or may represent a combination of program steps and logic circuits, modules and functions. Computer programs may be stored on a memory. The memory may be of any type suitable to the local technical environment and may be implemented by using any suitable data storage technology. For example, the memory may be, but is not limited to, a read-only memory (ROM), a random access memory (RAM), an optical memory apparatus and system (digital video disc (DVD) or compact disc (CD)), or the like. Computer-readable media may include non-transitory storage media. The data processor may be of any type suitable to the local technical environment, such as, but not limited to, a general-purpose computer, a special-purpose computer, a microprocessor, a digital signal processor (DSP), an application-specific integrated circuit (ASIC), a field programmable gate array (FPGA) and a processor based on a multi-core processor architecture.

What is claimed is:

1. A method for controlling precoding, comprising:
    receiving configuration parameters configured by a base station for the precoding, wherein the precoding is used for feeding back a channel state;
    determining, according to the configuration parameters, an upper limit value of a feedback number of coefficients of composition vectors of the precoding; and
    adjusting the upper limit value of the feedback number;
    wherein adjusting the upper limit value of the feedback number comprises: modifying at least one configuration parameter or at least one control parameter that affects the upper limit value of the feedback number, and modifying the upper limit value of the feedback number by using the modified at least one configuration parameter or the modified at least one control parameter; and
    wherein the at least one control parameter that affects the upper limit value of the feedback number comprises a number of frequency domain vectors of the precoding, and wherein modifying the at least one control parameter that affects the upper limit value of the feedback number comprises:
        determining, based on the number of frequency domain vectors, a value range of an influence parameter of the upper limit value of the feedback number.

2. The method according to claim 1, wherein adjusting the upper limit value of the feedback number further comprises:
    modifying the upper limit value of the feedback number.

3. The method according to claim 2, wherein modifying the upper limit value of the feedback number comprises:
taking a larger of the upper limit value of the feedback number and a preset upper limit value of the feedback number as the upper limit value of the feedback number.

4. The method according to claim 2, wherein modifying the upper limit value of the feedback number comprises:
adjusting, according to a rank of a transmission layer of the precoding, an upper limit value of a feedback number corresponding to the rank of the transmission layer; and
taking a larger of the adjusted upper limit value of the feedback number and a preset upper limit value of the feedback number as the upper limit value of the feedback number corresponding to the rank of the transmission layer.

5. The method according to claim 3, wherein the preset upper limit value of the feedback number comprises a positive integer determined by the rank of the transmission layer of the precoding.

6. The method according to claim 1, wherein control parameters that affect the upper limit value of the feedback number comprise a number of space domain vectors of the precoding and the number of frequency domain vectors of the precoding, and wherein modifying the at least one control parameter that affects the upper limit value of the feedback number comprises at least one of:
calculating a number of space domain vectors corresponding to a first class of rank of a transmission layer of the precoding by using a first proportional function, and rounding a calculation result down to obtain a number of space domain vectors corresponding to a second class of rank of the transmission layer of the precoding; or
calculating a number of frequency domain vectors corresponding to a first class of rank of a transmission layer of the precoding by using a second proportional function, and rounding a calculation result down to obtain a number of frequency domain vectors corresponding to a second class of rank of the transmission layer of the precoding.

7. The method according to claim 1, wherein control parameters that affect the upper limit value of the feedback number comprise a number of space domain vectors of the precoding and the number of frequency domain vectors of the precoding, the configuration parameters comprise the number of space domain vectors, an influence parameter of the number of frequency domain vectors and the influence parameter of the upper limit value of the feedback number, and wherein modifying the at least one configuration parameter or the at least one control parameter that affects the upper limit value of the feedback number comprises at least one of:
calculating a number of space domain vectors corresponding to a first class of rank of a transmission layer of the precoding by using a first proportional function, and taking a larger of a calculation result and a preset value of the number of space domain vectors as a number of space domain vectors corresponding to a second class of rank of the transmission layer of the precoding;
calculating a number of frequency domain vectors corresponding to a first class of rank of a transmission layer of the precoding by using a second proportional function, and taking a larger of a calculation result and a preset value of the number of frequency domain vectors as a number of frequency domain vectors corresponding to a second class of rank of the transmission layer of the precoding;
calculating an influence parameter of a number of frequency domain vectors corresponding to a first class of rank of a transmission layer of the precoding by using a third proportional function, and taking a larger of a calculation result and a preset value of a first influence parameter as an influence parameter of a number of frequency domain vectors corresponding to a second class of rank of the transmission layer of the precoding; or
calculating an influence parameter of an upper limit value of a feedback number corresponding to a first class of rank of a transmission layer of the precoding by using a fourth proportional function, and taking a larger of a calculation result and a preset value of a second influence parameter as an influence parameter of an upper limit value of a feedback number corresponding to a second class of rank of the transmission layer of the precoding.

8. The method according to claim 6, wherein a coefficient of the first proportional function, a coefficient of the second proportional function, a coefficient of the third proportional function and a coefficient of the fourth proportional function each comprise a positive number determined by the second class of rank of the transmission layer of the precoding.

9. The method according to claim 6, wherein the first class of rank represents a rank of 1 or 2, and the second class of rank represents a rank greater than 2.

10. The method according to claim 7, wherein the preset value of the number of space domain vectors comprises a positive integer determined by the second class of rank of the transmission layer of the precoding, the preset value of the number of frequency domain vectors comprises a positive integer determined by the second class of rank of the transmission layer of the precoding, the preset value of the first influence parameter comprises a positive integer determined by the second class of rank of the transmission layer of the precoding, or the preset value of the second influence parameter comprises a positive integer determined by the second class of rank of the transmission layer of the precoding.

11. The method according to claim 1, wherein the configuration parameters comprise a number of space domain vectors, an influence parameter of a number of frequency domain vectors and the influence parameter of the upper limit value of the feedback number, and wherein modifying the at least one configuration parameter that affects the upper limit value of the feedback number comprises at least one of:
determining, based on a rank of a transmission layer of the precoding, a value range of the number of space domain vectors;
determining, based on a rank of a transmission layer of the precoding, a value range of the influence parameter of the number of frequency domain vectors; or
determining, based on a rank of a transmission layer of the precoding, the value range of the influence parameter of the upper limit value of the feedback number.

12. The method according to claim 1, further comprising:
determining control parameters of the precoding in the process of adjusting, wherein the control parameters comprise a number of space domain vectors of the precoding, the number of frequency domain vectors of the precoding and the upper limit value of the feedback number of the precoding;

generating the precoding according to the control parameters; and sending the precoding to the base station.

13. A terminal device for controlling precoding, comprising a processor and a memory, wherein the memory is configured to store instructions; and the processor is configured to read the instructions to execute the method of claim 1.

14. The method according to claim 4, wherein the preset upper limit value of the feedback number comprises a positive integer determined by the rank of the transmission layer of the precoding.

15. The method according to claim 7, wherein the first class of rank represents a rank of 1 or 2, and the second class of rank represents a rank greater than 2.

16. A method for controlling precoding, comprising:

sending configuration parameters configured for the precoding to a terminal device, wherein the precoding is used for feeding back a channel state;

determining, according to the configuration parameters, an upper limit value of a feedback number of coefficients of composition vectors of the precoding; and adjusting the upper limit value of the feedback number;

wherein adjusting the upper limit value of the feedback number comprises: modifying at least one configuration parameter or at least one control parameter that affects the upper limit value of the feedback number, and modifying the upper limit value of the feedback number by using the modified at least one configuration parameter or the modified at least one control parameter; and wherein the at least one control parameter that affects the upper limit value of the feedback number comprises a number of frequency domain vectors of the precoding, and wherein modifying the at least one control parameter that affects the upper limit value of the feedback number comprises:

determining, based on the number of frequency domain vectors, a value range of an influence parameter of the upper limit value of the feedback number.

17. The method according to claim 16, wherein adjusting the upper limit value of the feedback number further comprises:

modifying the upper limit value of the feedback number.

18. The method according to claim 16, further comprising:

receiving the precoding sent by the terminal device; and evaluating, according to the adjusted upper limit value of the feedback number, the precoding.

19. A base station for controlling precoding, comprising a processor and a memory, wherein the memory is configured to store instructions; and the processor is configured to read the instructions to execute the method of claim 16.

* * * * *

UNITED STATES PATENT AND TRADEMARK OFFICE
CERTIFICATE OF CORRECTION

PATENT NO. : 11,909,467 B2
APPLICATION NO. : 17/593950
DATED : February 20, 2024
INVENTOR(S) : Yong Li et al.

It is certified that error appears in the above-identified patent and that said Letters Patent is hereby corrected as shown below:

In the Specification

In Column 3, Line 44, delete "$U=[u_0^T, u_1^T, \ldots u_{M-1}^T]^T$." and insert --$U = [u_0^T, u_1^T, \ldots, u_{M-1}^T]^T$--.

In Column 6, Line 58, delete "$N_{SB}$" and insert --$N_{SB}$.--.

In Column 13, Line 15 (Approx.), delete "$A_M$;" and insert --$A_M$);--.

In Column 13, Line 41, delete "($l_b$," and insert --($L_b$,--.

Signed and Sealed this
Thirtieth Day of April, 2024

Katherine Kelly Vidal
*Director of the United States Patent and Trademark Office*